United States Patent [19]

Kwon

[11] Patent Number: 4,722,827
[45] Date of Patent: Feb. 2, 1988

[54] ZIRCONIUM AND HAFNIUM WITH LOW OXYGEN AND IRON

[75] Inventor: Young J. Kwon, Fruit Heights, Utah

[73] Assignee: Westinghouse Electric Corp., Pittsburgh, Pa.

[21] Appl. No.: 780,343

[22] Filed: Sep. 26, 1985

[51] Int. Cl.⁴ .......................................... C22C 16/00
[52] U.S. Cl. .................................. 420/422; 75/0.5 B; 75/0.5 BB; 75/84.4; 75/84.5; 75/228; 75/245; 75/251; 148/11.5 F; 148/133; 148/421; 376/900; 423/69; 423/76
[58] Field of Search .................. 376/900; 75/228, 245, 75/251, 0.5 B, 0.5 BB, 84.4, 84.5; 148/133, 421, 11.5 F; 420/422, 580

[56] References Cited

U.S. PATENT DOCUMENTS

| | | | |
|---|---|---|---|
| 2,787,539 | 4/1957 | Conklin | 75/84.5 |
| 2,916,362 | 12/1959 | Horrigan et al. | 23/294 |
| 3,057,682 | 10/1962 | Groce | 23/114 |
| 3,715,205 | 2/1973 | Ishizuka | 75/84.5 |
| 3,966,460 | 6/1976 | Spink | 75/84.4 |
| 4,094,706 | 6/1978 | Schulson et al. | 376/900 |
| 4,200,492 | 4/1980 | Armijo et al. | 176/82 |
| 4,306,887 | 12/1981 | Barosi et al. | 420/422 |
| 4,368,072 | 1/1983 | Siddall | 75/84.4 |
| 4,372,817 | 2/1983 | Armijo et al. | 376/417 |
| 4,447,045 | 5/1984 | Kimura et al. | 266/149 |
| 4,556,420 | 12/1985 | Evans | 75/84.5 |
| 4,668,287 | 5/1987 | Kwon | 75/84.5 |

OTHER PUBLICATIONS

Topical Report GEAP-22101, vol. II, pp. A1-30 and A1-31, published Apr. 1982.
Reactor Handbook, vol. 1, pp. 708-709, published by Interscience Publishers, New York, 1960.
The System Zirconium-Aluminum, by D. J. McPherson and M. Hansen, Transactions of the American Society for Metals, vol. 46, p. 354, 1954.
ASTM Special Technical Publication 639, entitled "ASTM Manual on Zirconium and Hafnium", pp. 5, 10 and 59, American Society for Testing and Materials, Tallahassee, Fla., Dec. 1977.

Primary Examiner—Stephen J. Lechert, Jr.
Attorney, Agent, or Firm—R. A. Stoltz

[57] ABSTRACT

This is a high quality zirconium or hafnium sponge, a fuel element cladding liner having material of the quality of this sponge and a process utilizing this quality sponge to fabricate liner material for lined fuel element cladding. The sponge contains 250–about 350 ppm of oxygen impurity, 50–300 ppm of iron impurity, and a total of 500–1,000 ppm of impurity. This material is much purer than conventional sponge and approaches the quality of crystal bar.

8 Claims, 3 Drawing Figures 4,722,827

ZIRCONIUM AND HAFNIUM WITH LOW OXYGEN AND IRON

CROSS-REFERENCE TO RELATED APPLICATIONS

A process for making high purity zirconium and hafnium without utilizing crystal bar processing is described in related application Ser. No. 780,342, now U.S. Pat. No. 4,668,287, assigned to the same assignee and filed herewith. That related application is the first known process for producing the high purity sponge of this invention.

A process utilizing a combined reduction-distillation furnace is described in related copending application Ser. No. 546,601, assigned to the same assignee, and that related application is incorporated by reference herein. The aforementioned process of application Ser. No. 780,342 utilizes certain features and is an improvement on application Ser. No. 546,610 now U.S. Pat. No. 4,556,420.

BACKGROUND OF THE INVENTION

1. Field of the Invention:

This invention relates to metallurgy and to zirconium and hafnium metallic compositions, and in particular to a very high purity reactive metal sponge material.

2. Description of the Prior Art:

In the commercial production of zirconium and hafnium metal, the ore is generally initially subjected to a chlorination step which produces a relatively impure, hafnium-containing zirconium tetrachloride and byproduct silicon tetrachloride (which by-product is relatively easily separated). The hafnium and zirconium containing material is then subjected to a number of purifying operations and also a complex hafnium separation operation. These operations result in purified oxides of zirconium and hafnium, which, of course, are maintained separate. The purified oxides are separately chlorinated. Zirconium and hafnium are commonly reduced from the chloride by means of a reducing metal such as magnesium. At the present time, the commercial processes are batch-type processes. U.S. Pat. No. 3,966,460, for example, describes a process of introducing zirconium tetrachloride vapor onto molten magnesium, with the zirconium being reduced and traveling down through the magnesium layer to the bottom of the reactor and with the by-product magnesium chloride being periodically removed. In the commercial processes, however, the by-product salt (e.g. magnesium chloride) remains in the reduction vessel until the batch is completed and cooled. The salt and metallic sponge (zirconium or hafnium) are then removed from the reduction vessel. The metallic sponge (containing remaining salt and some remaining excess reducing metal) is then placed in a distillation vessel for removal of the remaining salt and magnesium by high temperature vacuum distillation. Generally this intermediate product sponge contains 1,000–5,000 ppm (and more typically 2,000–3,000 ppm by weight) of total impurities, including generally about 500–1,000 (and more typically 700–1,000) ppm oxygen, 300–800 ppm iron, 30–70 ppm aluminum, 1–5 ppm uranium, and 10–20 ppm phosphorous.

The sponge material is generally crushed, screened, and pressed into electrodes for melting (alloying elements are often added to the vacuum arc melting electrode). The crushed sponge material is particulate and of minus ¼ inch, and plus 16 mesh in size. Typically the material is double vacuum arc melted to provide ingots which are then further fabricated into various shapes. Most of the zirconium currently is used to produce Zircaloy.

Commercial nuclear reactors generally have used Zircaloy tubes as cladding material to contain the uranium dioxide fuel. Generally a Zircaloy ingot is processed into a so-called "trex" and pilgering operations are used to reduce the trex inside diameter and wall thickness to size.

Ultrapure zirconium has been proposed for a liner for the inside surface of Zircaloy tubing which is used as cladding for nuclear fuel and is described in, for example, U.S. Pat. No. 4,372,817 to Armijo et al. on Feb. 8, 1983. A similar use of a moderate purity material is proposed in U.S. Pat. No. 4,200,492 to Armijo on Apr. 29, 1980. The ultrapure zirconium material described has been purified by iodide cells to produce so-called "crystal bar" material. This rather expensive crystal bar processing is performed after reduction and is discussed, for example, in U.S. Pat. No. 4,368,072 issued to Siddall on Jan. 11, 1983.

Hafnium has also been purified by the crystal bar process, and is used, for example, for control rod material in nuclear reactors.

SUMMARY OF THE INVENTION

This is a high purity zirconium or hafnium sponge which contains 500–1,000 ppm total impurities, including 250–about 350 ppm oxygen and 50–300 ppm of iron. This provides an inexpensive intermediate product which can be processed for use in applications requiring high purity material without resorting to expensive crystal bar processing. Preferably this material contains less than 20 ppm of aluminum, less than 1 ppm of uranium, and less than 5 ppm of phosphorous. This metallic sponge is significantly higher in purity than any prior art sponge. While this sponge material has an oxygen level slightly higher than crystal bar material, processes utilizing this sponge are considerably less expensive and the extremely low oxygen level of crystal bar material is generally unnecessary.

This invention also provides a fuel elements cladding having a Zircaloy exterior and a high purity zirconium or zirconium alloy liner, with the liner having total impurities of 500–1,000 ppm, including 250–about 350 ppm of oxygen and 50–300 ppm of iron, an alloying agent, such as tin or silicon, which improve the aqueous corrosion resistance but do not significantly increase the hardness, may be added to the liner material.

This invention also provides a process for making nuclear fuel element cladding, of the type of process wherein sponge is melted into an ingot and the ingot is fabricated into a fuel element cladding liner, with the improvement being the use of sponge containing total impurities of 500–1,000 ppm, and 250–about 350 ppm of oxygen and 50–300 ppm of iron.

BRIEF DESCRIPTION OF THE DRAWINGS

This invention can be best understood by reference to the following drawings, in which.

DESCRIPTION OF THE PREFERRED EMBODIMENTS

This invention provides a very high quality hafnium or zirconium metallic sponge, an improved process utilizing the sponge to fabricate liner material for a lined fuel element cladding and the lined fuel element cladding which is produced thereby. This is not only the first sponge of this quality, but is apparently also the first material of this quality, being generally similar to crystal bar material, but having somewhat higher oxygen.

Hafnium of this purity is usable directly for nuclear fuel element control rods, without further purification, and zirconium of this purity is, for example, usable, without further purification, as the liner material for lined fuel element cladding. Both materials may, of course, be utilized for other applications requiring high purity material. Not only is the elimination of the crystal bar processing a significant saving in the processing cost, but also represents a considerable savings in capital investment. Lined fuel element cladding is coming into wide use, especially for boiling water type reactors, and the projected usage of ultrapure material far exceeds the present capacity of existing crystal bar furnaces. Thus the usage of this material will avoid the construction of a large number of crystal bar furnaces.

As noted above, one usage of zirconium of such purity is for the inner liner of Zircaloy tubing for use in nuclear reactors. The material of this invention contains about 50–300 ppm of iron, 250–about 350 ppm of oxygen, and contains total impurities of about 500–1,000 ppm. Thus this material has slightly higher oxygen, but generally crystal bar-like purity, without the expense of crystal bar processing.

Initially 50 kilogram batches of zirconium sponge were made, and very high quality sponge was achieved (see Table 1 below). Although the iron level is very low, further reduction of iron can be achieved by subjecting the zirconium or hafnium metal to electron beam melting. Generally, however, this sponge is of sufficient purity, and preferably is fabricated without further purification.

Figure 1A:
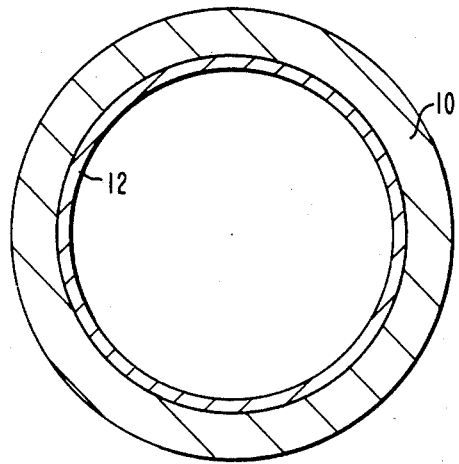
FIGS. 1a and 1b show a section of a nuclear fuel element utilizing lined cladding, with the inner lining being the ultrapure zirconium material of this invention.
Figure 1B:
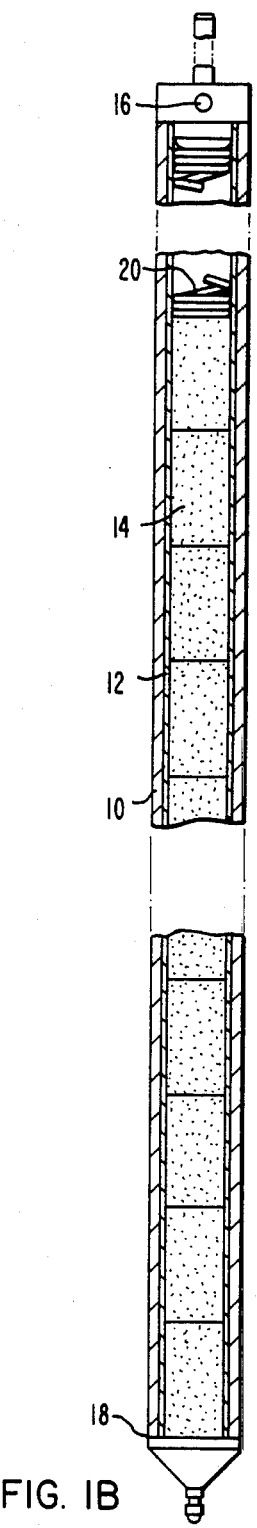

FIG. 1A shows a transverse cross-section through clad tubing and in particular shows a Zircaloy outer portion 10 and an inner liner 12. FIG. 1B shows a schematic presentation of a partial cross-section through a water reactor fuel element having lined cladding. The outer Zircaloy portion 10 and the inner liner 12 contain fuel pellets 14. Top end cap 16 is circumferentially welded to the cladding, as is bottom end cap 18 to form a hermetically sealed container around the fuel pellets 14 and spring 20. A fuel element utilizing a tin-containing inner liner material, is described in Ser. No. 589,300, filed Mar. 14, 1984 and assigned to the same assignee and incorporated by reference herein. Even if alloyed, ultrapure material, especially low oxygen, is extremely desirable. Especially in unalloyed material, low iron content is also desirable, as large iron-zirconium precipitates may act as crack initiation sites.

Figure 2:
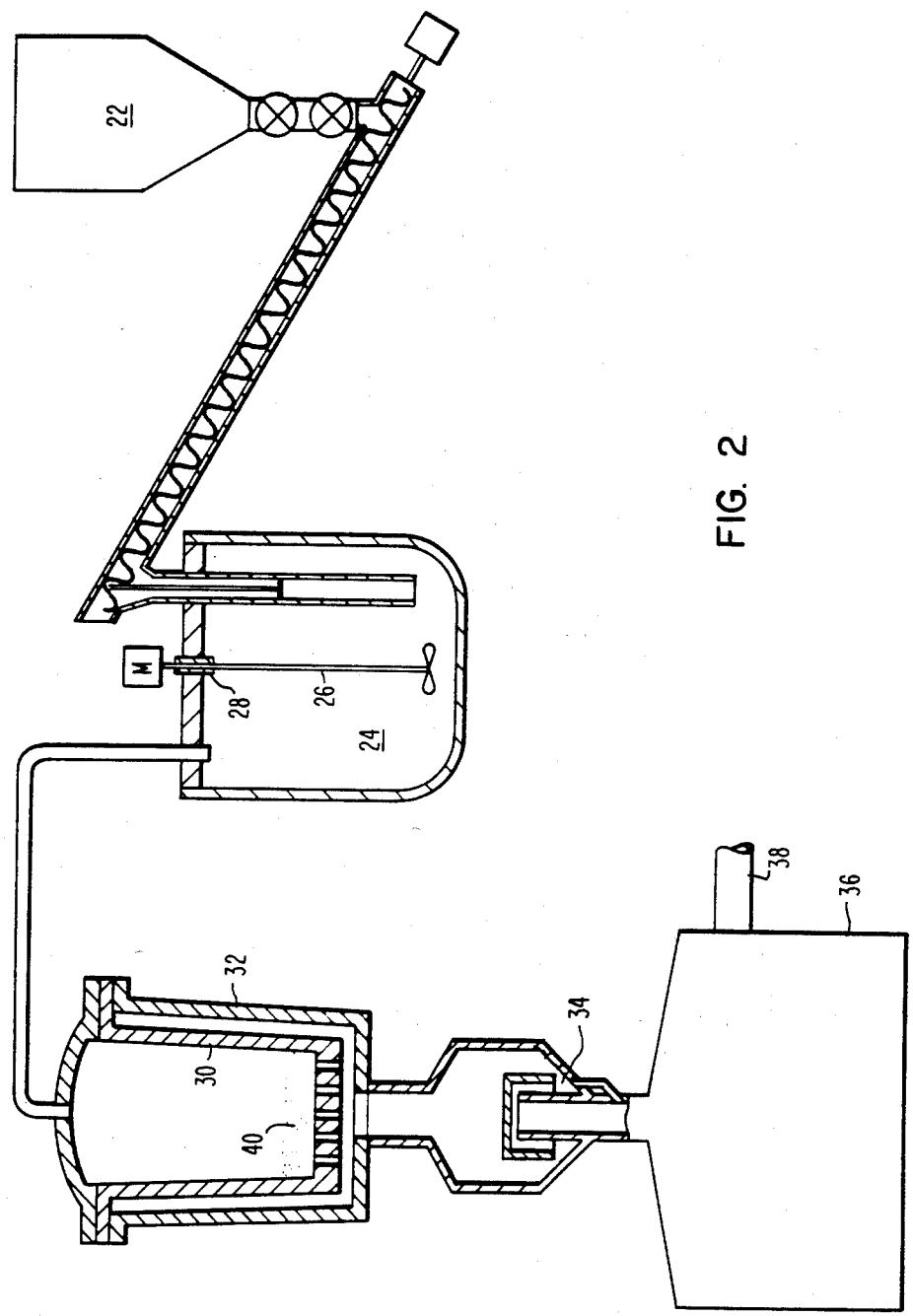
FIG. 2 shows an elevation, in section, of a combined furnace and the metallic sponge produced thereby.

FIG. 2 generally illustrates an apparatus which can be used to produce the ultrapure metallic sponge of this invention. Zirconium or hafnium tetrachloride is fed from the hopper 22 into the fused salt sublimer 24. An agitator 26 stirs the molten salt with leakage being prevented by the molten seal 28 (e.g. molten lead-antimony). Tetrachloride (zirconium or hafnium) sublimes from the surface of the molten salt and the vapor is fed directly into the inner liner 30 of the reduction-distillation vessel 32. A removable seal 34 (as in U.S. Pat. No. 4,447,045 to Kimura, issued May 8, 1984) can be used to isolate the condenser 36 and the vacuum system 38 from the reduction-distillation vessel during the reduction opertion, but to open and connect the condenser 36 and the vacuum system 38 with the reduction-distillation vessel 32 during the distillation phase. After the distillation phase is complete the sponge 40 can be removed (along with the inner liner 30) from the reduction-distillation vessel 32. Table 1 (below, N/M indicates "not measured") shows typical sponge quality in small 50 kilogram batches.

TABLE 1

SPONGE QUALITY (50 Kg BATCH)
(Impurities in ppm)

|   | Run 1 | Run 2 | Run 3 |
|---|-------|-------|-------|
| U | <1    | <1    | <1    |
| Al| 12    | 12    | <10   |
| Fe| 103   | <100  | 147   |
| P | N/M   | N/M   | <1.0  |
| N | <20   | <20   | 22    |
| O | 340   | 396   | 393   |
| C | N/M   | N/M   | 90    |

Table 2, below, shows the general impurities as anticipated in a 5,000 pound batch of material (listed impurities and typical prior art, other impurities not listed, totalling 500–1,000 ppm). This is an intermediate-sized production batch, and, in a full-sized furnace, even lower impurities, especially iron, are anticipated.

TABLE 2

SPONGE QUALITY (5000 LBS. BATCH)
(Impurities in ppm)

|    |         | Typical Prior Art |
|----|---------|-------------------|
| Al | <20     | 30–70             |
| Fe | 100–200 | 300–800           |
| P  | <5      | 10–20             |
| N  | <20–30  | 30–70             |
| O  | 250–350 | 700–1,000         |
| C  | 40–100  | 40–100            |
| U  | <1      | 1–5               |

The high purity sponge can be further processed into high purity ingot without resorting to the iodide (crystal bar) process. In making nuclear reactor cladding, the ingot is further processed into a so-called "tube shell" and into a "trex". Further processing into lined fuel element cladding, the trex can have an outer cylinder of Zircaloy with an inner cylinder of material of the high purity of this process.

The invention is not to be construed as limited to the particular examples dexcribed herein, as these are to be regarded as illustrative rather than restrictive. The invention is intended to cover all embodiments and processes which do not depart from the spirit and scope of the invention.

I claim:

1. A high purity zirconium sponge or hafnium sponge, said sponge consisting of 250–about 350 ppm of oxygen impurity, 50–350 ppm of iron impurity, total impurities of 500–1,000 ppm, with the remainder being zirconium or hafnium, whereby an inexpensive intermediate product is provided which can be processed for use in applications requiring high purity material, without resorting to expensive crystal bar processing.

2. The sponge of claim 1, wherein the total impurities comprise aluminum impurity of less than 20 ppm, uranium impurity of less than 1 ppm, and phosphorous impurity of less than 5 ppm.

3. A high purity zirconium sponge, said sponge consisting of 250-about 350 ppm of oxygen impurity, 50-350 ppm of iron impurity, total impurities of 500-1,000 ppm, with the remainder being zirconium, whereby an inexpensive intermediate product is provided which can be processed for use in applications requiring high purity material, without resorting to expensive crystal bar processing.

4. The sponge of claim 3, wherein the total impurities comprise aluminum impurity of less than 20 ppm and phosphorous impurity of less than 5 ppm.

5. The sponge of claim 4, wherein the total impurities further comprise uranium impurity of less than 1 ppm.

6. A high purity hafnium sponge, said sponge consisting of 250-about 350 ppm of oxygen impurity, 50-350 ppm of iron impurity, total impurities of 500-1,000 ppm, with the remainder being hafnium, whereby an inexpensive intermediate product is provided which can be processed for use in applications requiring high purity material, without resorting to expensive crystal bar processing.

7. The sponge of claim 6, wherein the total impurities comprise aluminum impurity of less than 20 ppm and phosphorous impurity of less than 5 ppm.

8. The sponge according to claim 7, wherein the total impurities further comprise uranium impurity of less than 1 ppm.

* * * * *